(12) United States Patent
Kubanek et al.

(10) Patent No.: US 6,219,898 B1
(45) Date of Patent: Apr. 24, 2001

(54) CONTROL SYSTEM AND METHOD FOR AUTOMATIC FASTENING MACHINES

(75) Inventors: Kurt Kubanek, Tonawanda; Robert J. Kellner, Orchard Park, both of NY (US)

(73) Assignee: General Electro Mechanical Corporation, West Seneca, NY (US)

( * ) Notice: Subject to any disclaimer, the term of this patent is extended or adjusted under 35 U.S.C. 154(b) by 0 days.

(21) Appl. No.: 08/937,979

(22) Filed: Sep. 26, 1997

Related U.S. Application Data (60) Provisional application No. 60/027,276, filed on Sep. 27, 1996.

(51) Int. Cl.[7] ................................................. B23P 19/02
(52) U.S. Cl. ................................... 29/525.06; 318/568.2; 29/34 B; 29/701; 408/13
(58) Field of Search ......................... 29/407.01, 407.09, 29/407.1, 243.53, 243.54, 525.06, 701, 702, 703, 715, 34 B, 524.1; 408/1 R, 13, 88; 227/110, 99, 6; 318/568.2

(56) References Cited

U.S. PATENT DOCUMENTS

| | | | |
|---|---|---|---|
| 3,557,442 | * | 1/1971 | Speller ............................... 29/525.06 |
| 3,874,070 | * | 4/1975 | Falcioni ............................. 29/525.06 |
| 4,864,713 | * | 9/1989 | Roberts et al. ...................... 29/524.1 |
| 4,878,002 | * | 10/1989 | Heatzig et al. .................... 318/568.2 |
| 4,908,928 | * | 3/1990 | Mazurik et al. .................... 29/525.1 |
| 5,241,250 | * | 8/1993 | Nagasawa et al. .................. 318/591 |
| 5,248,922 | * | 9/1993 | Meshkat .............................. 318/560 |
| 5,252,899 | * | 10/1993 | Kawamura et al. .............. 318/568.1 |
| 5,357,668 | * | 10/1994 | Roberts ................................. 29/559 |
| 5,692,359 | * | 12/1997 | Casler ................................... 53/306 |

* cited by examiner

Primary Examiner—S. Thomas Hughes
Assistant Examiner—Steven Blount
(74) Attorney, Agent, or Firm—Hodgson Russ LLP (57) ABSTRACT

A control system and method for automatic fastening machines wherein a multi-axes motion controller is utilized in place of the conventional PLC or CNC control to provide for virtually an immediate change in system response when the systems feedback devices indicate the need for variance. The major advantage of the process control approach of the present invention is that all system feedback information is controlled via a single on board processor thus eliminating any communication lag associated with multi controller applications. This also provides for an improvement in fastener installation cycle time. An additional advantage to the approach of the present invention is the elimination of many mechanical hard stops and their respective electrical position switch indicators, which in turn reduces the chance for machine breakdowns resulting in a greater increase in productivity. The new control architecture of the present invention is utilized to control an "anti-wink" automatic slug riveting process which improves fastening accuracy, reliability and cycle time. This technique of fastening provides for virtually no work piece movement during the forming process allowing for the use of rigid fixturing.

23 Claims, 11 Drawing Sheets

CONTROL SYSTEM AND METHOD FOR AUTOMATIC FASTENING MACHINES

CROSS REFERENCE TO A RELATED APPLICATION

Applicants hereby claim priority based on Provisional Application No. 60/027,276 filed Sep. 27, 1996 and entitled "Control System And Method For Automatic Fastening Machines" which is incorporated herein by reference.

BACKGROUND OF THE INVENTION

This invention relates to the art of automatic fastening means, and more particularly to a new and improved control system and method for such machines.

One area of use of the present invention is in slug riveting methods and apparatus, although the principles of the present invention can be variously applied. The various fastener installation operations performed by automatic fastening machines have been controlled by CNC (computer numerical control) or PLC (programmed logic control) systems. The ability for a CNC or PLC controlled automatic slug riveting machine to produce a satisfactorily formed fastener is controlled through many variables. One of the most underlying problems is the rate at which these controls can respond to their respective process feedback devices.

It would, therefore, be highly desirable to provide a new and improved control system for automatic fastening machines which provides a significant reduction in the overall cycle time for installation of a fastener, which has a relatively rapid system response, which reduces communication time lags between system components, which eliminates the need for mechanical hard stops and electrical position switch indicators thereby reducing the probability of machine breakdowns and which simplifies the set up times associated with matching tooling cavities with motion involved in the fastener forming process.

SUMMARY OF THE INVENTION

The present invention provides a control system and method for automatic fastening machines wherein a multi-axes motion controller is utilized in place of the conventional PLC or CNC control to provide for virtually an immediate change in system response when the systems feedback devices indicate the need for variance. The major advantage of the process control approach of the present invention is that all system feedback information is controlled via a single on board processor thus eliminating any communication lag associated with multi controller applications. This also provides for an improvement in fastener installation cycle time. An additional advantage to the approach of the present invention is the elimination of many mechanical hard stops and their respective electrical position switch indicators, which in turn reduces the chance for machine breakdowns resulting in a greater increase in productivity. The new control architecture of the present invention is utilized to control an "anti-wink" automatic slug riveting process which improves fastening accuracy, reliability and cycle time. This technique of fastening provides for virtually no work piece movement during the forming process allowing for the use of rigid fixturing.

The foregoing and additional advantages and characterizing features of the present invention will become clearly apparent upon a reading of the ensuing detailed description together with the included drawing wherein:

DETAILED DESCRIPTION OF AN ILLUSTRATIVE EMBODIMENT

A typical anti-wink slug riveting process involving PLC or CNC control involves the use of many directional valves, hydraulic and pneumatic, to control the placement of the slug rivet such that when the actual squeeze process begins there will be no movement upward (wink) as the slug rivet forms. This finding of the slug is referred to as being "snug". A basic squeeze/squeeze slug riveting method and apparatus is shown and described in U.S. Pat. No. 4,908,928 issued Mar. 20, 1990 and entitled "Slug Riveting Method And Apparatus", the disclosure of which is hereby incorporated herein by reference. A basic anti-wink slug riveting method and apparatus is shown and described in U.S. Pat. No. 4,864,713 issued Sep. 12, 1989 and entitled "Method And Apparatus For Positioning Tooling And Riveting", the disclosure of which is hereby incorporated herein by reference.

In PLC or CNC controlled systems the squeeze/squeeze slug process requires the use of an upper buck cavity mechanical stop. This is the stop means 70 including rod 74 which engages the upper end of piston 68 of upper bucking ram 42 in the apparatus of FIG. 1 of U.S. Pat. No. 4,908,928. The upper bucking anvil is required to extend to its full down position to allow for the extension of this mechanical stop. At this point switches monitor the cavity stop extension and signal the PLC or CNC to retract the upper buck cylinder under a reduced pressure. The lower ram is then signaled to rise until a predetermined set snug force is indicated by a load cell located within the lower ram.

Figure 1:
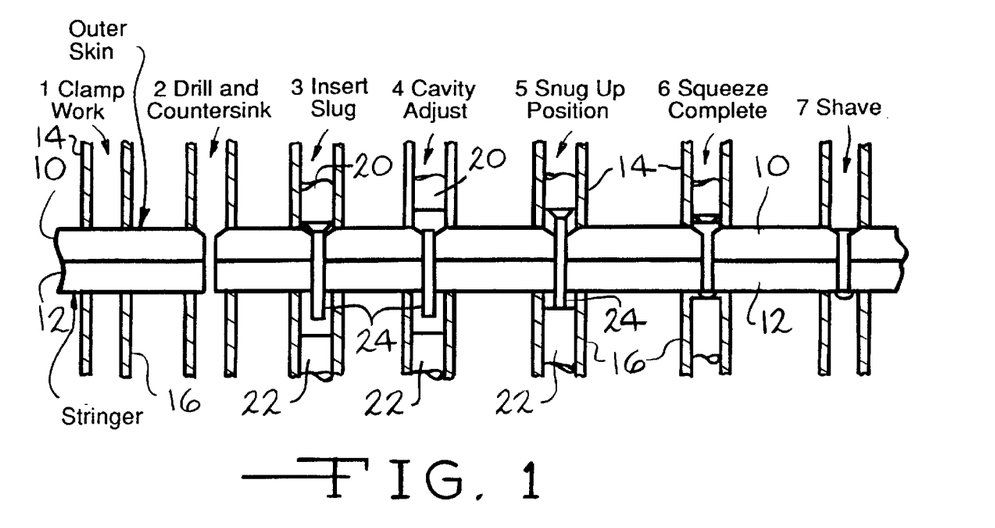
FIG. 1 is a diagrammatic sequence of views illustrating a sequence of operational steps included in a slug riveting method and apparatus under PLC/CNC control.

The foregoing is illustrated in FIG. 1 wherein two workpieces 10 and 12 to be joined or fastened together are between upper and lower clamps 14 and 16 of the apparatus. Clamp 14 is representative of the pressure foot 18 and clamp 16 corresponds to lower clamp 28 in the apparatus of U.S. Pat. No. 4,908,928. In step no. 3 of FIG. 1 herein the upper buck ram 20 is moved downwardly to its bottomed out or fully lowered position in a manner similar to that of ram 42 as described in step no. 6 in U.S. Pat. No. 4,908,928. The upper cavity is established in step 4 of FIG. 1 herein by moving buck ram 20 upwardly until it engages the aforementioned mechanical stop in a manner similar to that described for ram 42 and stop 74 in step nos. 7 and 8 in U.S. Pat. No. 4,908,928. Then lower ram 22 is raised until slug 24 is contacted by both rams 20 and 22 and a predetermined set force is indicated by a load cell (not shown in FIG. 1) in lower ram 22. This is shown in step no. 5 of FIG. 1 and corresponds to steps nos. 9 and 10 described in U.S. Pat. No. 4,908,1928. The rivet is formed by causing rams 20 and 22 to be moved toward each other as shown in step no. 6 of FIG. 1 which corresponds to steps nos. 11–14 described in U.S. Pat. No. 4,908,928. As indicated in FIG. 1, the total time required for steps nos. 3, 4, 5 and 6 of the cycle is 5.6 seconds.

The foregoing process can be improved in terms of reduced cycle time and in other respects according to the present invention by employing a multi-axes motion controller in the following manner. The directional valves which control the upper buck 20 are replaced by a hydraulic servo valve. In particular, at least directional valve 132 in the apparatus of U.S. Pat. No. 4,908,928 would be replaced by a hydraulic servo valve. Positional feedback is provided from a high resolution encoder. The command for the upper buck 20 to go to the snug position is now a programmed axes move. This allows for the elimination of the mechanical cavity stops and its associated hardware. In particular, stop means 70 including rod 74, piston 76, cylinder 72, stepping motor 78 and valve 112 in the apparatus of U.S. Pat. No. 4,908,928 would be eliminated. This in effect reduces the cycle time significantly for this process of the snug feature of squeeze/squeeze forming. Because the upper buck 20 cylinder does not need to travel to its maximum down position, the lower ram cavity can be significantly reduced thus shortening the distance required to perform the actual snug process which in turn reduces cycle time. At this point the lower ram 22 can be commanded to rise to its snug point. This positional move is determined through internal programming on board the motion controller. If it is found that there is sufficient force indicated by the lower ram load cell, the process is allowed to continue. If there is no fastener present or the load exceeds acceptable limits, the cycle can be halted and the operator can be alerted as to the proper corrective action required.

Figure 2:
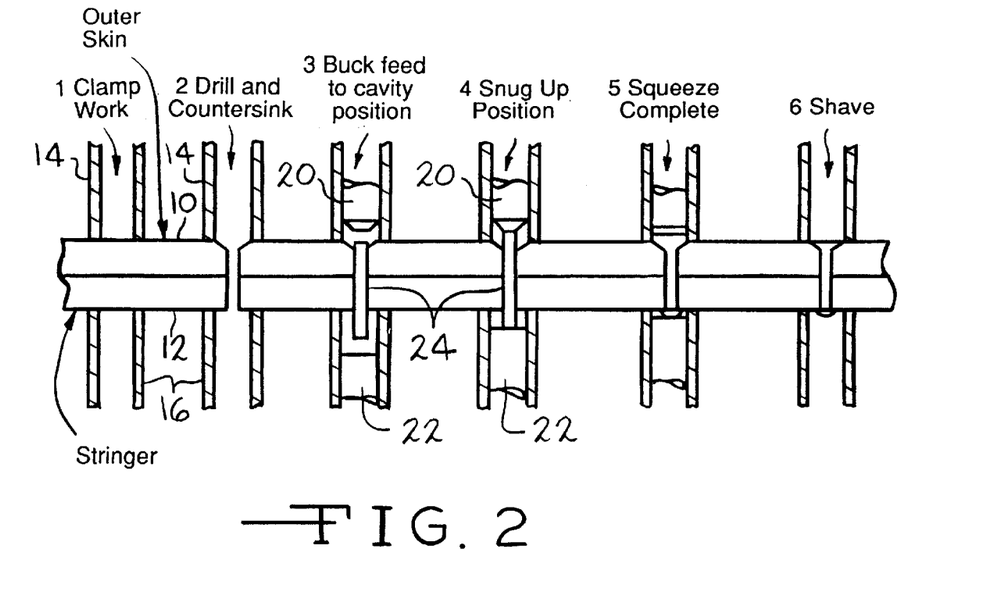
FIG. 2 is a diagrammatic sequence of views illustrating a sequence of operational steps included in a slug riveting method and apparatus utilizing a multi-axes motion controller in accordance with the present invention.

The foregoing is illustrated in FIG. 2 wherein during step no. 3 the upper buck 20 is moved into position by the aforementioned programmed axes move, and during step no. 4 the lower ram 22 is moved to its snug point by the afore-mentioned positional move. The rivet is formed by moving rams 20 and 22 toward each other as shown in step no. 5. As indicated in FIG. 2, the total time required for steps nos. 3, 4 and 5 of the cycle is 1.42 seconds. This is significantly less than the 5.6 seconds required for the corresponding steps in the CNC/PLC controlled process of FIG. 1. Therefore, the squeeze/squeeze cycle sequence utilizing a multi-axes controller advantageously provides a significant reduction in fastener installation time as compared to the conventional CNC/PLC controlled process.

In previous versions of squeeze/squeeze (anti-wink) systems both the upper and lower rams were controlled via one master hydraulic cylinder. For example, such a master cylinder is shown at 80, 82 in FIG. 1 of U.S. Pat. No. 4,908,928. This cylinder was mechanically linked to two additional cylinders (cylinder 88, 92 and cylinder 86, 90 of U.S. Pat No. 4,908,928) which controlled the motion, or force, associated with the upper and lower ram during the actual forming process. This required that the controlling cylinders were physically matched to their respective rams (upper ram 42 and lower ram 58 of U.S. Pat. No. 4,908,928) to provide for the motion needed during the squeeze. Any externally induced variables, such as seal leakage, could not be compensated for.

The multi-axes motion controller utilized in the system and method of the present invention is able to electronically link the upper and lower ram servos, i.e. the servo controlled valves associated with upper buck 20 and lower ram 22 in the system and method of FIG. 2. The motion controller allows for programmable ratios associated with their respective movement. This greatly simplifies set up times associated with matching tooling cavities with motion associated in the forming process. Because both the upper and lower ram are under closed loop servo control they will respond to each of their respective "outside disturbances" without affecting the other.

Another distinct cycle time advantage with the motion controller versus the PLC/CNC controlled conventional slug rivet process becomes apparent when the shaving cycle is required. As the slug rivet is formed in a conventional PLC/CNC controlled process the workpiece is shifted upward directly proportional to the upper tooling cavity. The pressure foot and clamp assembly maintain contact with the workpiece during this time. The lower ram is then required to descend, or "backaway" to allow for the pressure foot to return to its pre-upset position. This is done to allow for the upper head to transfer to the shave position in a safe manner. This operation requires the lower ram to move a dimension equal to the lower tooling cavity (minus the upset tail height) plus the upper buck cavity (minus approximately 0.38 mm) at a rate which will allow for the workpiece to become unclamped for the subsequent shave operation.

Figure 3:
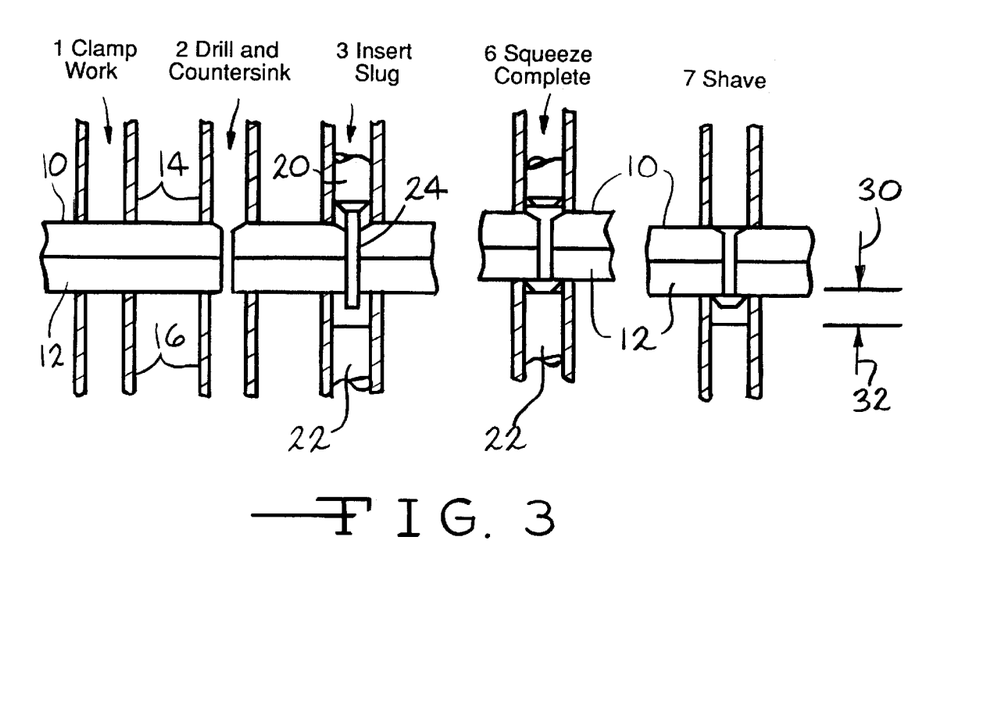
FIG. 3 is a diagrammatic sequence of views including a shave step in a slug riveting method and apparatus under PLC/CNC control.

The foregoing is illustrated in FIG. 3 which shows a conventional PLC/CNC controlled slug rivet process wherein the steps performed up to completion of the squeeze or rivet formation are the same as those steps in the conventional process of FIG. 1. Step 6 in FIG. 3 illustrates the workpiece 10, 12 being shifted upwardly directly proportional to the upper tooling cavity as described above. Step 7 in FIG. 3 illustrate the "backaway" move of lower ram 22 to return pressure foot 14 to its pre-upset position. In step 7 upper ram 20 has been moved away to allow the shave tool (not shown) to take its place within pressure foot 14 for the shave operation. The extent of the "backaway" move dimension is indicated by arrows 30 and 32 in FIG. 3.

The same squeeze-squeeze scenario utilizing the multi-axes motion controller in accordance with the present invention can be accomplished with very little ram motion required for "backaway" to be attained. Because the actual workpiece wink is virtually non existent (typically less than 0.762 mm) the requirement for the lower ram 22 to move is greatly decreased. The action required from the lower ram during this particular function is to simply descend enough to eliminate contact between the lower tool die and the formed slug rivet tail. This dimension can be typically less than a 2.54 mm move allowing for upper head deflection.

Figure 4:
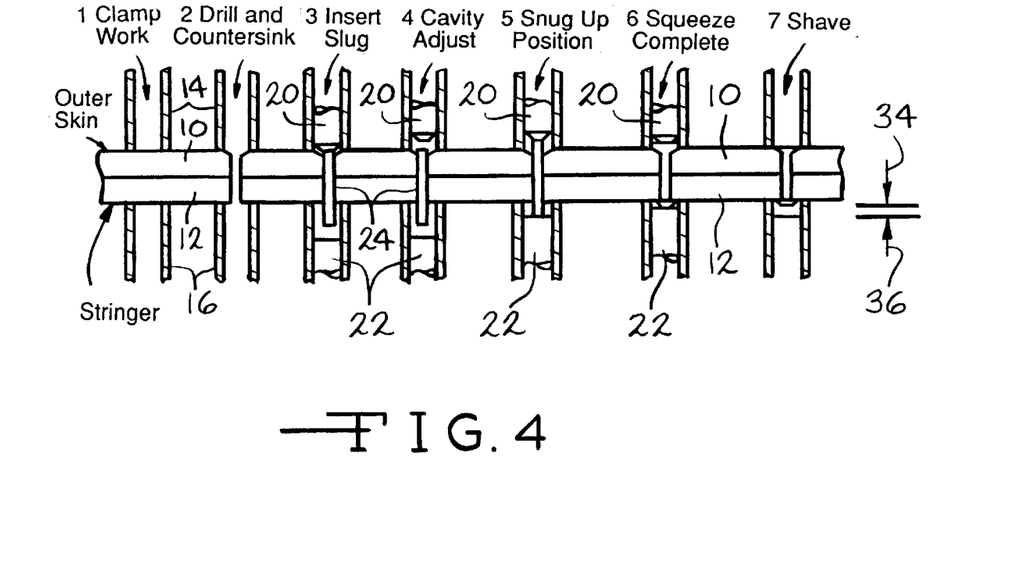
FIG. 4 is a diagrammatic sequence of views including a shave step in a slug riveting method and apparatus utilizing a multi-axes motion controller in accordance with the present invention.

The foregoing is illustrated in FIG. 4 wherein the extent of the "backaway" move dimension is indicated by arrows 34 and 36 and is significantly smaller than the "backaway" dimension indicated in FIG. 3.

Typically in a PLC/CNC controlled environment there are a number of "smart" devices which control machine motion connected to the PLC/CNC via serial communication lines. The PLC/CNC will "direct" the action required of the machine depending on what information is being supplied over these serial communication lines. This communication lag time is eliminated entirely when utilizing a single processor for all of the process critical machine functions. A single multi-axes motion controller is now capable of controlling the upper head transfer, drill, upper buck, shave, and lower ram servos.

An equally important aspect of the single processor control architecture is that of safety. The need to slow down the system in order to allow for the scan time of the PLC/CNC has virtually been removed. Because there is no lag time associated with serial communication, more complex safety considerations can be programmed on board the motion controller itself. If an error occurs anywhere in the process, the multi-axes controller can decide on what action to take without any additional information from outside sources. An example of this is how the lower ram safety control is handled. In PLC/CNC controlled machines, typically a physical limit switch is adjusted to allow for maximum ram movement. The overall speed of the lower ram must be adjusted to insure that the internal scan rates of the PLC/CNC do not interfere with the safety, accuracy, and/or repeatability. In the multi-axes motion controller the lower ram can be commanded to move positionally to a known dimension where a slug fastener should be. During this move the load cell in the lower ram is monitored. If there is a rise in the load cell input, then the motion controller can switch feedback modes from positional (encoder feedback) to torque (load cell feedback) without any noticeable change in velocity. Likewise, if there is not a fastener present the lower ram will simply come into position at its commanded endpoint where the appropriate failure warning can be presented to the operator and the proper corrective action can be performed.

Figure 5:
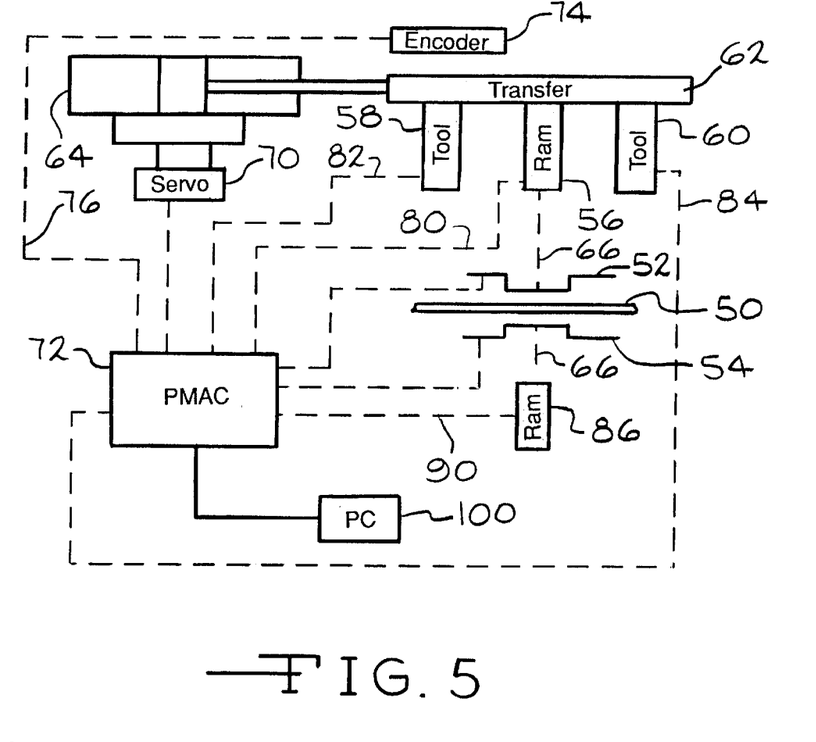
FIG. 5 is a block diagram of the control system of the present invention.

FIG. 5 further illustrates the control system and method according to the present invention for automatic fastening machines. A workpiece 50 similar to workpiece 10, 12 in FIGS. 2 and 4 is between an upper clamp or pressure foot 52 and a lower clamp 54. Clamps 52 and 54 are similar to clamps 14 and 16, respectively, in FIGS. 2 and 4. An upper bucking ram 56 and additional tools such as drill 58 and shaver 60 are carried by a transfer member 62 operated by a motive means in the form of transfer cylinder 64 to move the components into and out of a working position in alignment with a work axis 66. For a more detailed description of the role of transfer means 62, reference may be made to U.S. Pat. No. 5,329,691 issued Jul. 19, 1994 entitled "Hole Probe Apparatus", the disclosure of which is hereby incorporated herein by reference. In accordance with the present invention, transfer cylinder 64 is controlled by a servo device in the form of servo valve 70 which, in turn, is controlled by a multi-axes motion controller 72. Information on the position or location of transfer means 62 is provided by an encoder 74 and provided to controller 72. Each of the tools 56, 58 and 60 is controlled by a servo device such as a servo valve and has an encoder associated therewith as will be described in further detail presently. Lines 80, 82 and 84 between tools 56, 58 and 60, respectively, and multi-axes controller 72 indicate connection between the encoder and servo device of each tool and controller 72 for control of the servo devices and associated tools by controller 72. There is provided a lower ram 86 having a servo device such as a servo valve together with an encoder and, a load cell. Line 90 indicates connection between controller 72 and the servo valve, encoder and load cell of lower ram 86 for control of the servo valve and thus lower ram 86 by controller 72. Lines 94 and 96 between controller 72 and upper and lower clamps 52 and 54, respectively, indicate receipt of positional information on clamps 52 and 54 and, if desired, control of clamps 52 and 54 by controller 72. As shown, a computer 100 can be connected to controller 72 to monitor and supervise the process and to down-load information on the fastening process. For a more detailed description of the type of information which would be down-loaded, reference may be made to U.S. Pat. No. 5,615,474 issued Apr. 1, 1997, the disclosure of which is hereby incorporated herein by reference.

A multi-axes motion controller 72 found to perform satisfactorily in the method and apparatus of the present invention is a programmable multi-axis controller commercially available from Delta Tau Data Systems of Northridge, Calif. under the designation PMAC Motion Controller. FIGS. 6A, 6B, 8, 9 and 10A, 10B illustrate the servo control loops of this PMAC Motion Controller for controlling the drill 58, lower ram 86, upper buck ram 56 and shaver 60 in the system illustrated in FIG. 5.

Figure 6A:
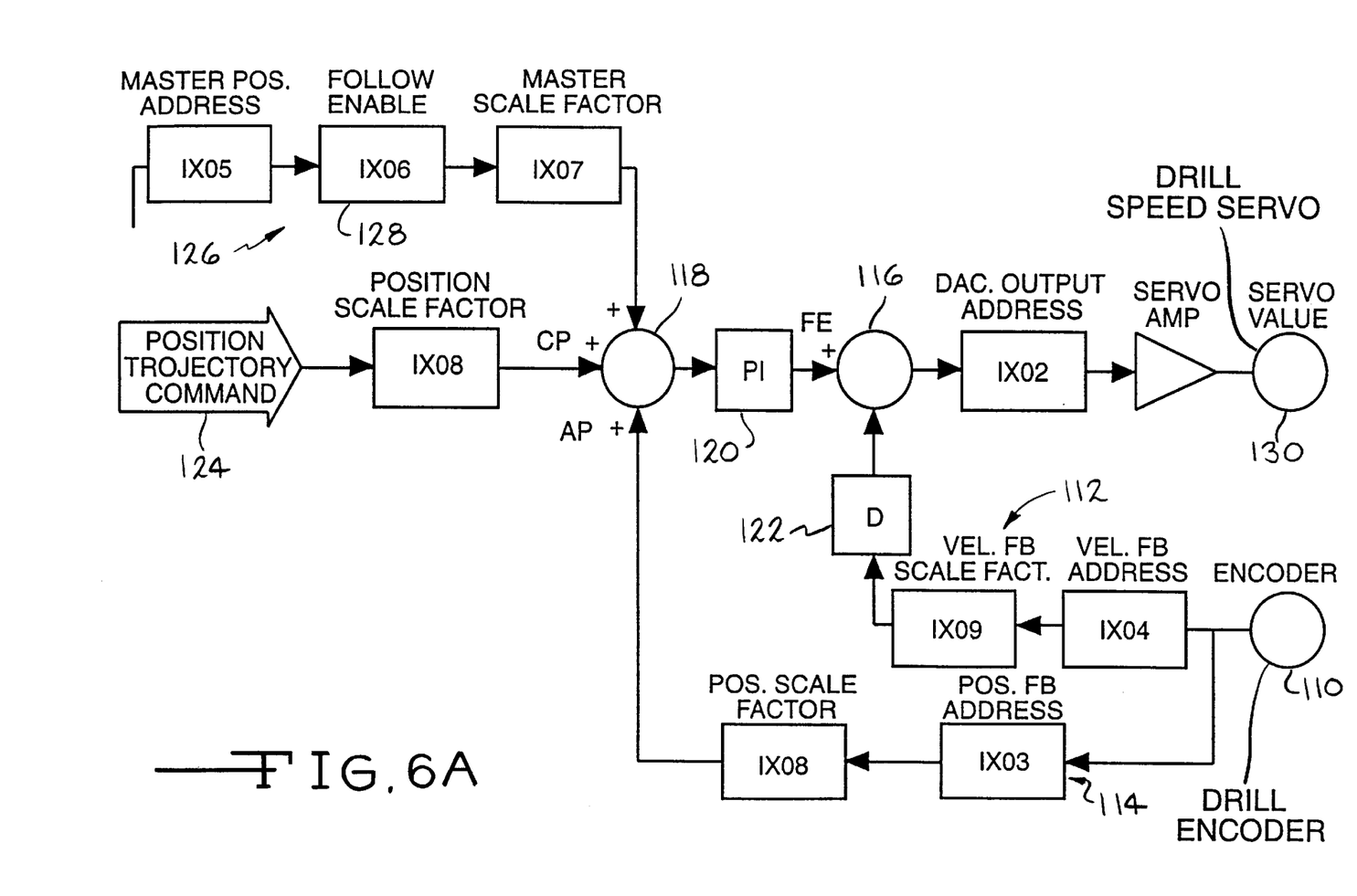
FIGS. 6A and 6B are schematic diagrams of the servo control loops for the drill in the system of FIG. 5.
Figure 6B:
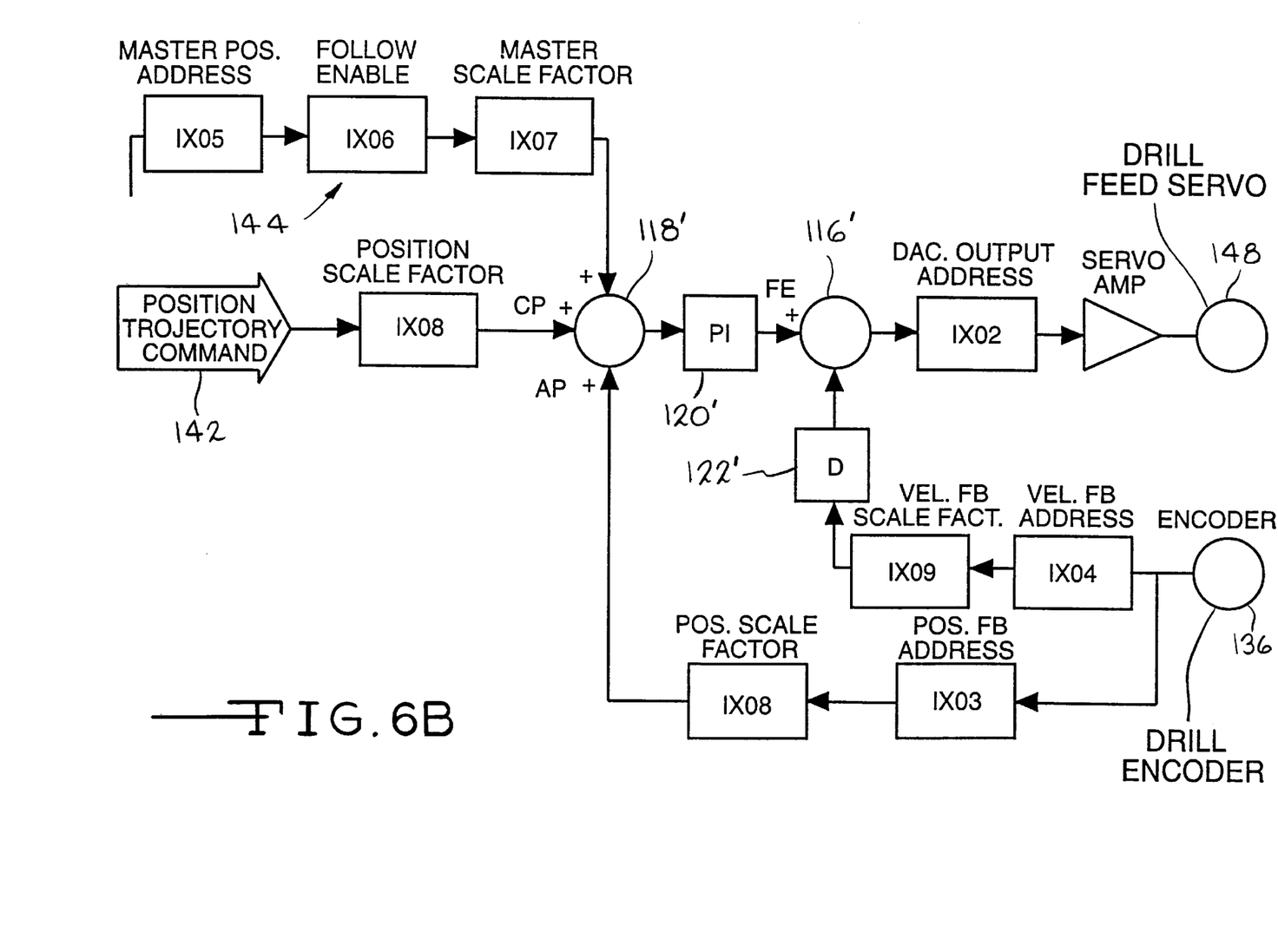

The servo control loop shown in FIG. 6A controls the speed of drill 58 and the loop shown in FIG. 6B controls drill feed rate. Referring first to FIG. 6A, encoder 110 provides input information on actual drill speed and direction of rotation, and the velocity (speed) and position (direction of rotation) branches 112 and 114 provide inputs to summing junctions 116 and 118. Components 120 and 122 provide adjustment in the proportional, integral and derivative parameters of the loop. The desired drill speed from either a program command or an operator input signal is received at 124. Branch 126 allows for an auxiliary input command for drill position under the on/off control provided by component 128. Operation of the servo control loop of FIG. 6A results in a control signal to valve 130 which controls operation of the hydraulic motor which rotates drill 58.

Referring now to FIG. 6B, encoder 136 is a linear encoder associated with the cylinder which operates to move drill 58 toward and away from the workpiece. Encoder 136 provides information on the location of drill 58 as it moves toward and away from the workpiece. The desired feed rate, approach point and end point, i.e. three command variables are received at 142. Branch 144 handles commands relating to drill set up, end point and approach point. Operation of the servo control loop of FIG. 6B results in a control signal to servo valve 148 which controls operation of the hydraulic cylinder which moves drill 58 toward and away from the workpiece.

Figure 7A:
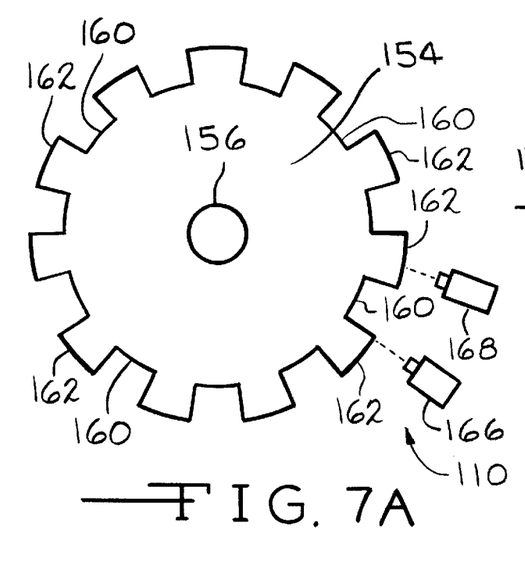
FIGS. 7A and 7B are schematic diagrams illustrating an encoder for use with the drill and other rotary tools controlled by the system of the present invention.
Figure 7B:
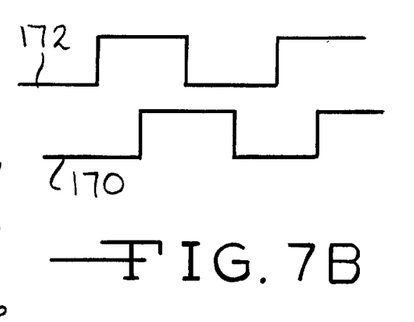

FIGS. 7A and 7B show a form of encoder 110 for providing information on drill speed and direction of rotation. The plan view of FIG. 7A shows an encoder element 154 in the form of a disc fixed to the rotating drill shaft 156 at an appropriate location. This can be, for example, at the splined junction between the output shaft of the drill motor and the end of the drill bit. In response to rotation of drill shaft 156, disc rotates in the place of the paper as viewed in FIG. 7A. The circumferential surface of disc 154 is provided with successive regions of equal accurate length and an alternating optical characteristic or property. In the preferred mode, the property is optical reflectivity. This can be provided by the equally spaced recesses or notches 160 between the surface portions 162. Alternatively, a smooth continuous circumferential surface of disc 154 could be provided with alternating light reflecting and light absorbing portions. A pair of optical transmitter/receiver devices 166 and 168 is provided in operative association with the circumferential surface disc 154. Each device 166, 168 includes a light transmitting component such as an LED and a light sensitive receiving element such as a photo transistor. At a reference location, one device such as device 166 is aligned with an edge transition between a surface 162 and the adjacent slot 160 and the other device 168 is aligned with a surface 162.

Waveforms 170 and 172 are generated by devices 166, 168 wherein the high portions of the pulse waveforms correspond to the device receiving light reflected back from the reflecting surface portions, and the low portions of the pulse waveforms correspond to the devices being aligned with the non-reflecting or low reflecting portion, i.e. notches 160. The circumferential length plus number of notches 160 in the circumference of disc 154 together with the number of pulses in a measuring time internal can be used by the control system processor to calculate drill speed of rotation. By storing the relative positions of waveforms 170 and 172 in the processor for a given positional relationship between devices 166, 168 at a reference position of disc 154, i.e. which device is registered with an edge and which is registered with a surface 162, an examination of the relative positions of the waveforms 170, 172 by the processor will provide a determination of the direction of rotation of the drill. The encoder of FIGS. 7A and 7B can be used on other rotary tools in a fastening machine, for example the shave tool 60.

Figure 8A:
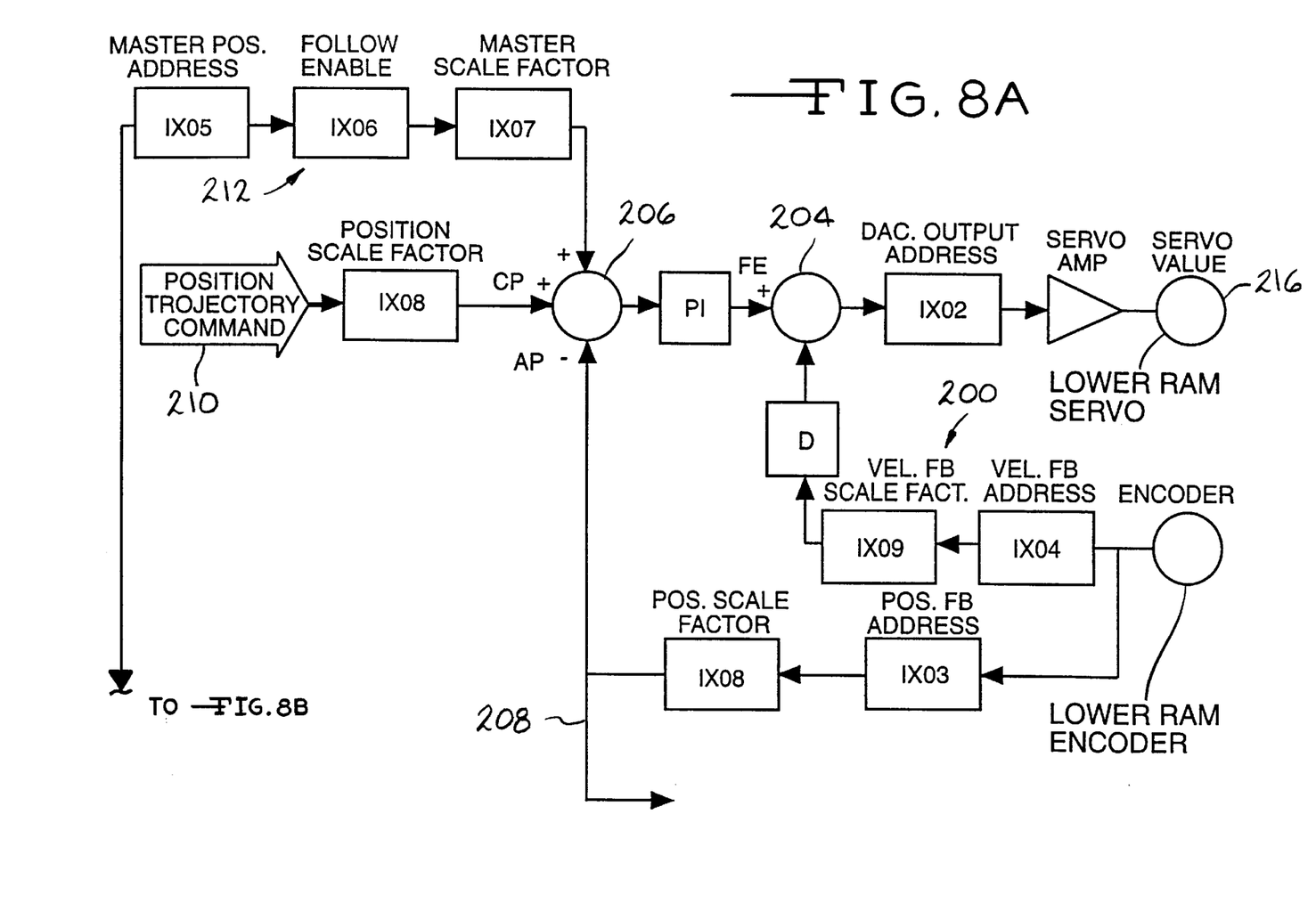
FIG. 8 is a schematic diagram of the servo control loops for the lower ram in the system of FIG. 5.
Figure 8B:
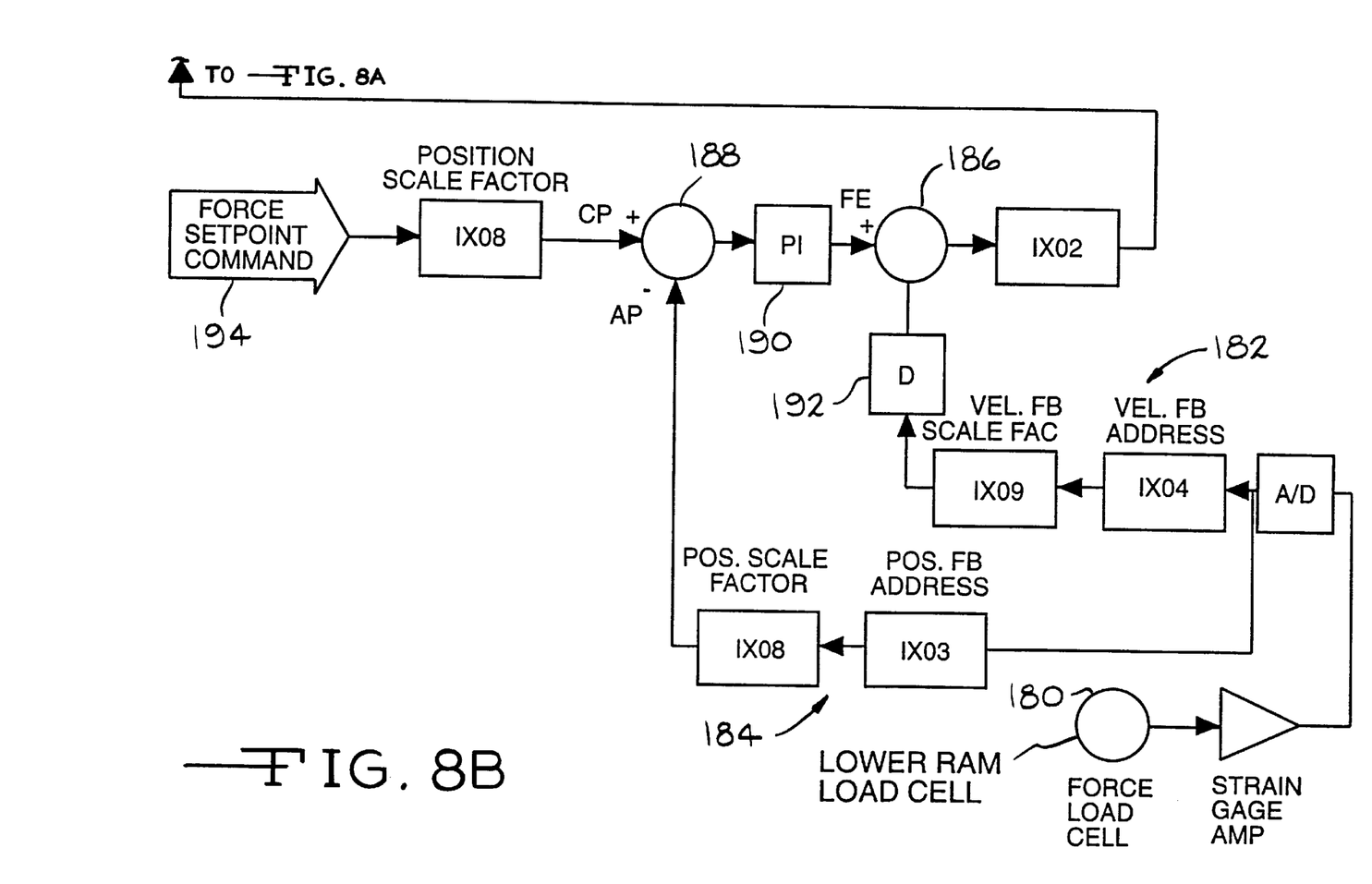

The servo loops shown in FIG. 8 control the operation of lower ram 86. A load cell 180 in the upper anvil portion of ram 86 provides input information on actual force between ram 86 and the end of the slug in the workpiece when contacted by the ram. The rate of force 182 and amount of force 184 branches provide inputs to summing junctions 186 and 188. Components 190 and 192 provide adjustment in the proportional, integral and derivative parameters of the loop. The magnitude of the desired rivet upset force is input at 194 via program command or operator input signal. Operation of this servo control loop provides a force control signal to the other servo control loop shown in FIG. 8 for controlling lower ram 86. A linear encoder 198 associated with lower ram 86 provides information on the location of the ram as it moves toward and away from the workpiece. Branches 200 and 202 provide ram position information to summing junctions 204 and 206, and components 208 and 209 provide adjustment in the proportional, integral and derivative parameters of the loop. The output of branch 202 at 209 is connected to the servo control loop of the upper bucking cylinder for a purpose to be described. Position commands relating to clamping, snug, rivet insertion and rate of movement are received at 210. Branch 212 receives the force command signal from the other loop in FIG. 8 result in a control signal to servo valve 216 which controls operation of the hydraulic cylinder which, moves lower ram 86 toward and away from the workpiece and the slug positioned therein.

Figure 9A:
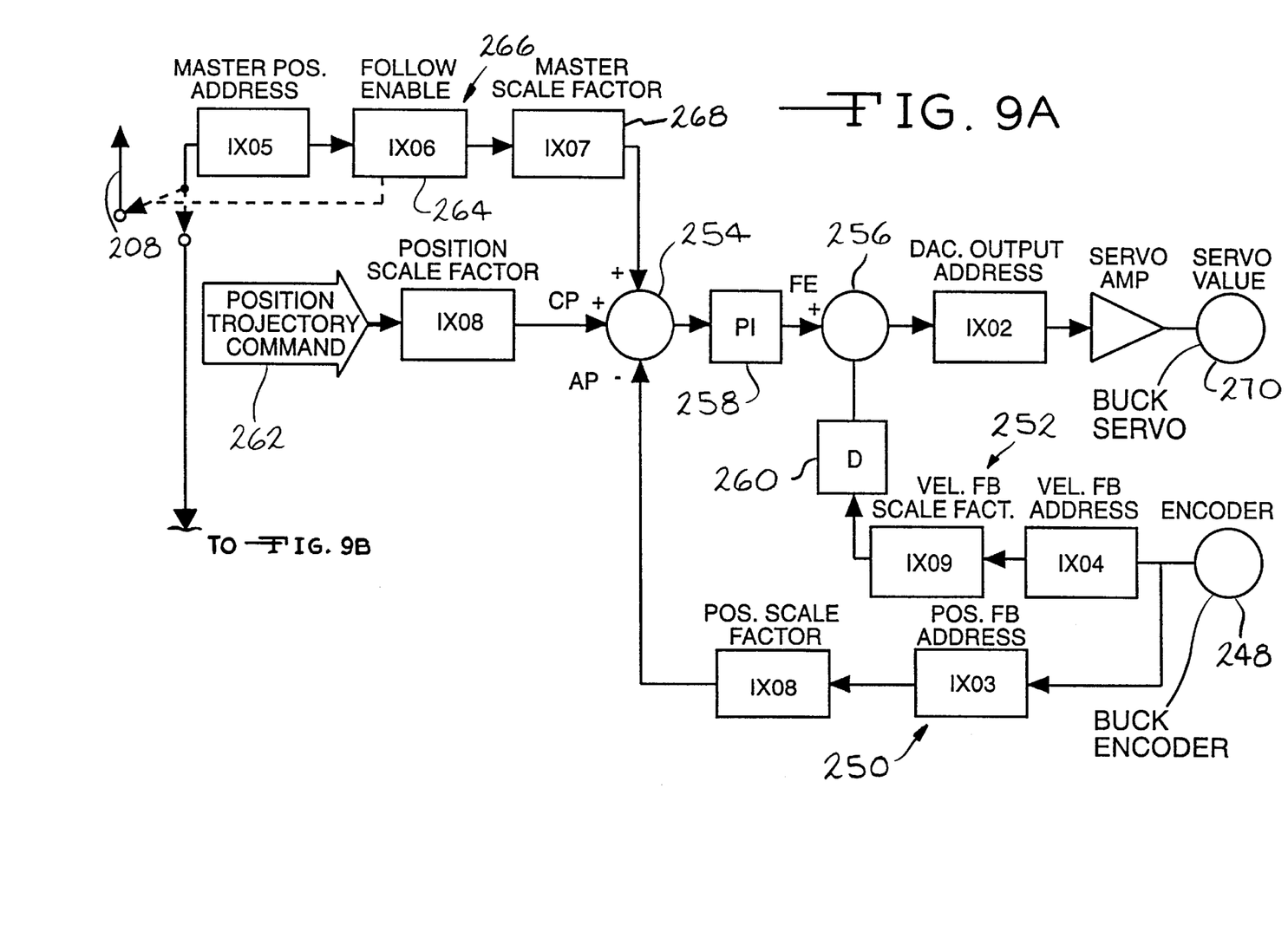
FIG. 9 is a schematic diagram of the servo control loops for the upper ram in the system of FIG. 5.
Figure 9B:
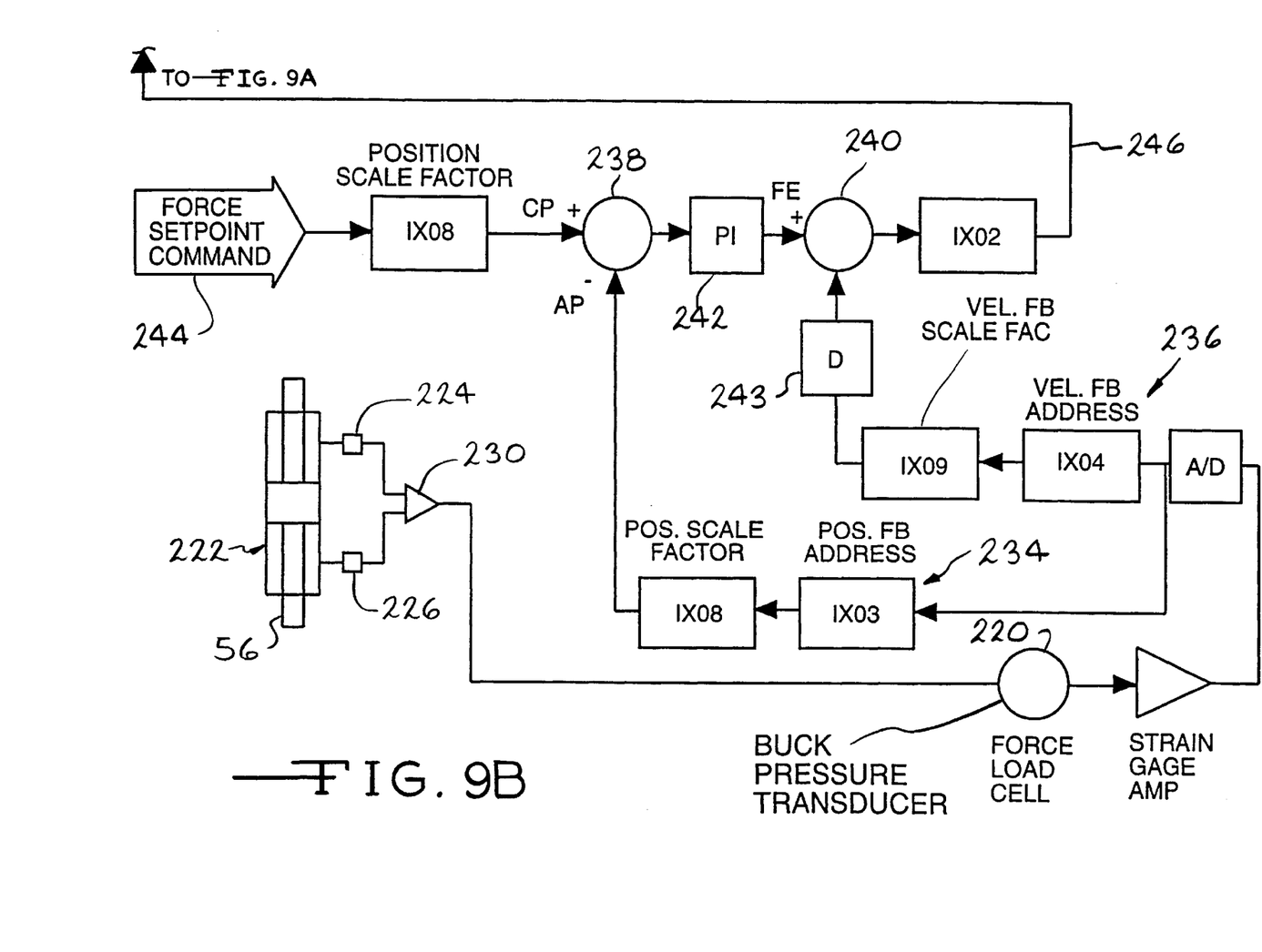

The servo loops of FIG. 9 control the operation of the upper buck ram 56. A buck pressure transducer 220 provides information on the hydraulic fluid pressure in the cylinder 222 which moves ram 56. Actually, transducer 220 provides the result of the combination of the two pressure transducers 224, 226 on opposite sides of the buck cylinder piston 228 which transducers operate in a differential mode with their outputs combined by a differential amplifier 230, the output of which is connected to transducer 220. Branches 234 and 236 provide pressure information inputs to summing junctions 238 and 240, respectively, and components 242 and 242 provide adjustment in the proportional, integral and derivative parameters of the loop. A desired pressure limit is input at 244. This provides maximum protection against workpiece damage. Movement of bucking ram 56 is controlled in a pressure mode rather than in a speed mode. Both pressure limits and low pressure for corresponding low buck movement can be programmed in. Operation of this servo control loop provides a pressure control signal at 246 to the other servo control loop shown in FIG. 9 for controlling upper ram 56.

A linear encoder 248 associated with bucking ram 56 provides information on the location of the ram as it moves toward and away from the workplace. Branches 250 and 252 provide ram position information inputs to summing junctions 254 and 256, and components 258 and 260 provide adjustment in the proportional, integral and derivative parameters of the loop. Commands relating to approach position, upper die cavity position and rate of movement are input at 262. Component 264 in branch 266 determines whether branch 266 receives a pressure control signal from the other control loop in FIG. 9 or a control signal from the lower ram servo control loop of FIG. 8. Thus, component 264 determines whether or not to switch control to the pressure mode. Component 268 controls the ratio of upper ram movement to lower ram movement which will be described. Operation of the servo control loops of FIG. 9 result in a control signal to servo valve 270 which controls the operation of upper buck cylinder 222 which moves upper ram 56 toward and away from the workpiece and the slug positioned therein.

When lower ram 86 moves to the snug position, the slug is trapped between upper buck ram 56 and lower ram 86. The load cell in lower ram 86 senses contact with the slug and this signals the control system to synchronize movement of the upper and lower rams. In particular, depending upon the input process information, the control system determines how much the upper buck ram 56 moves with respect to lower ram 86 during upset of the rivet. For example, in forming a straight slug rivet, upper buck 56 moves 75 percent of the movement of lower ram 86, and for index heads upper buck 56 moves 50 percent of the movement of lower ram 86. Both rams 56 and 86 move at the same time but have different lengths of movement. The foregoing is determined by information in component 268 in the servo control loop of FIG. 9. As a result of the foregoing, there is no need to move the workpiece, and therefore all of the energy of lower ram 86 can be used to upset the rivet rather than expending some of that energy to raise the workpiece.

Figure 10A:
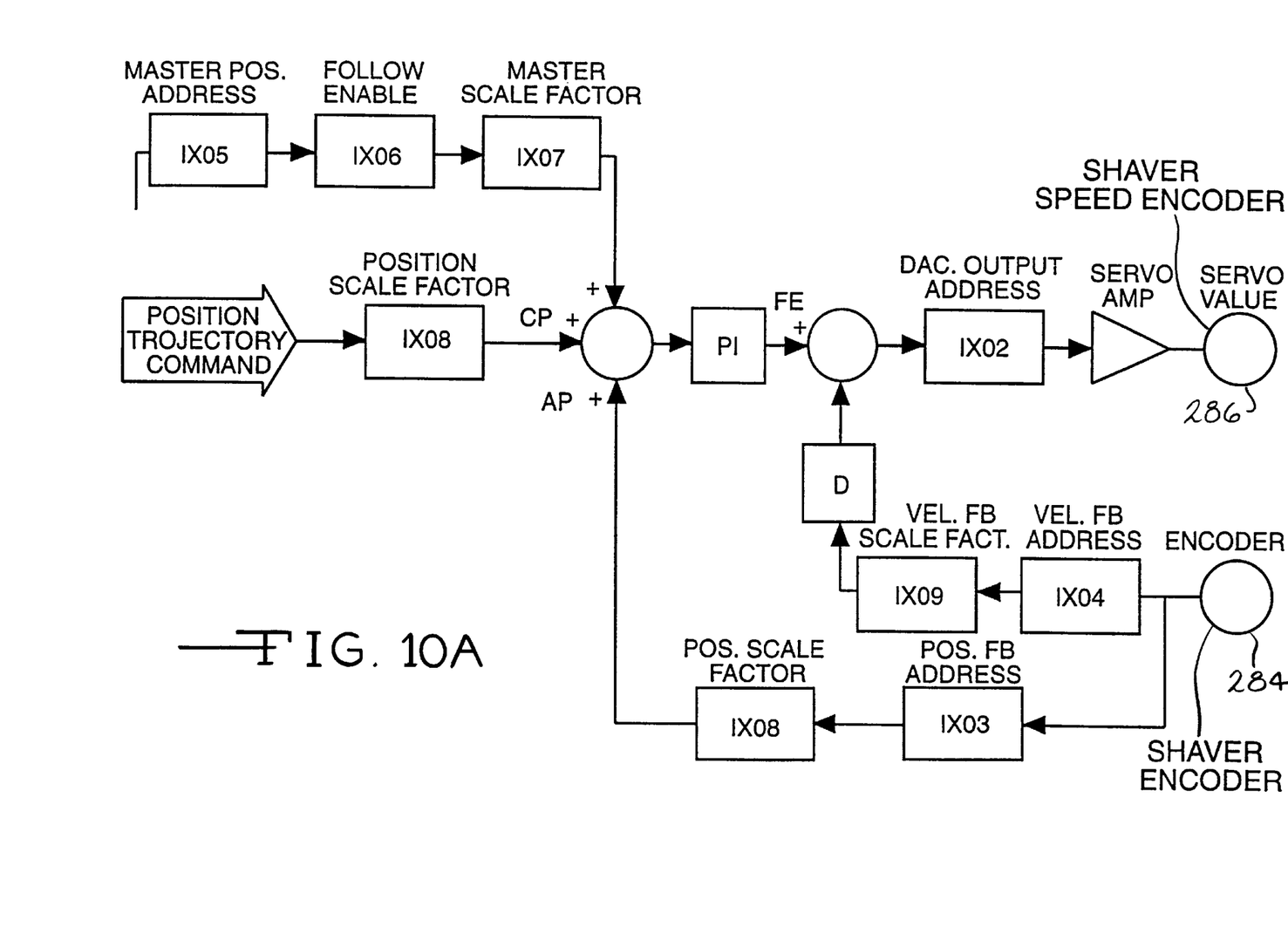
FIGS. 10A and 10B are schematic diagrams of the servo control loops for the shaver in the system of FIG. 5.
Figure 10B:
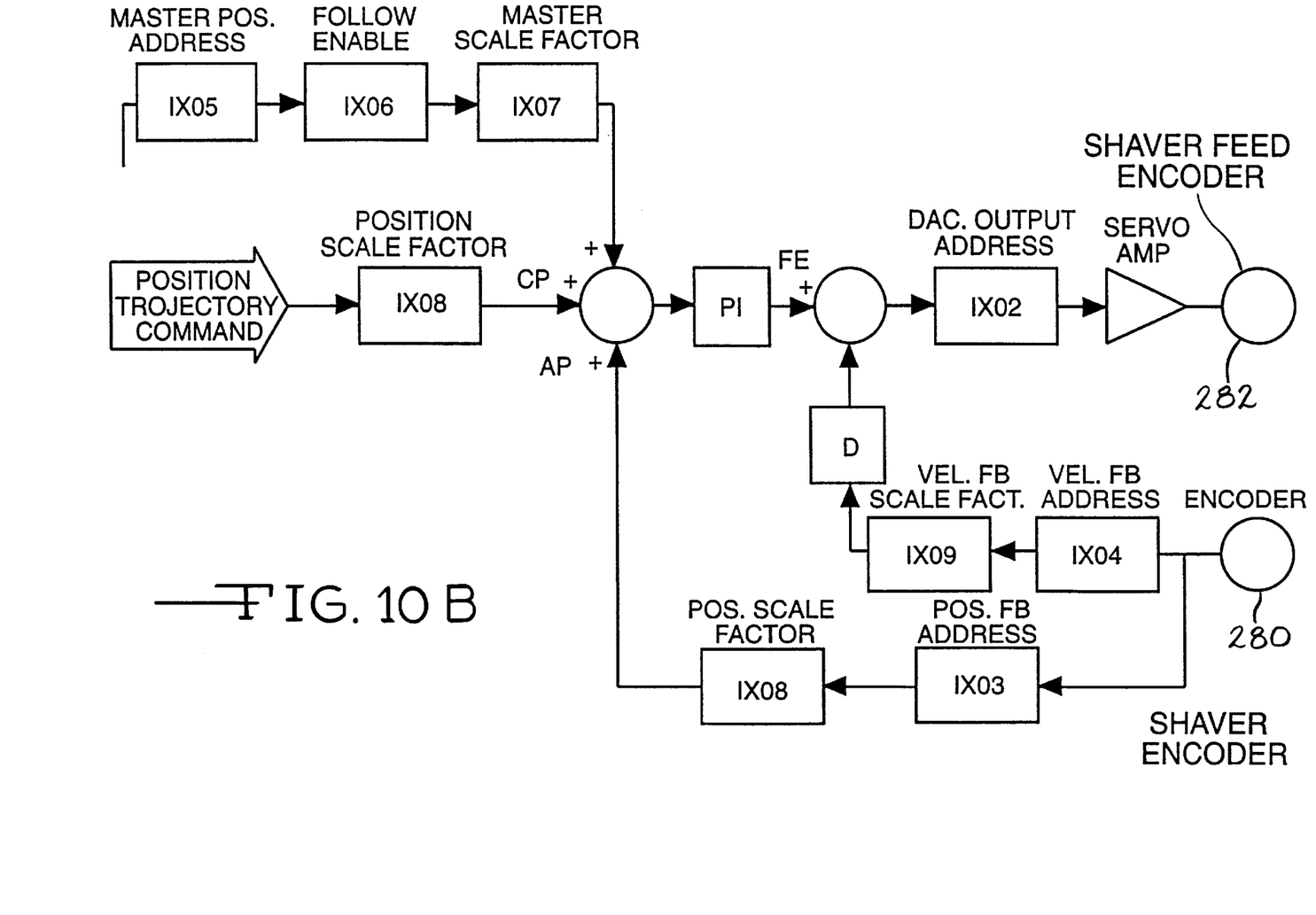

The servo control loop shown in FIG. 10A controls the speed of shaver 60 and the loop shown in FIG. 10B controls shaver feed rate. The loops of FIGS. 10A and 10B are substantially identical and operate in the same way as the loop of FIGS. 6A and 6B. Encoder 280 provides shaver position information, servo valve 282 controls movement of shaver 60 toward and away from the workpiece, encoder 284 provides information on speed and direction of rotation of shaver 60 and servo valve 286 controls shaver speed.

The PMAC multi-axis controller 72 described hereinabove thus provides dual loop servo control where it is possible to change the feedback device of an axis in motion with no apparent loss of control. Therefore it is possible to blend positional moves and force controlled motion very efficiently. There is no need for a resetting period during which no motion commands would be executed and therefore no dead time.

The system and method of the present invention provides one motion controller for all axes of motion. This is in contrast to prior art control systems employing a plurality of motion controllers, one for each axis, with the need for each one to communicate independently with the PLC thereby expending a substantial amount of processor time.

The PMAC multi-axis motion controller 72 described hereinabove includes a digital signal processor (DSP) rather than a CPU which is particularly important for controlling movements along a plurality of axes. In addition, another processor, such as the personal computer 100 shown in FIG.

5, can communicate with the DSP of controller 72 for graphical presentation of information on the operation of the automatic fastening machine for monitoring, supervision, diagnostics and the like including recording of data from each cycle of machine operation. The PMAC multi-axis motion controller 72 also advantageously can process both analog and digital signals which is beneficial for use in automatic fastening machines where control of force during rivet upset formation calls for analog devices in the feedback control. Also, as illustrated hereinabove, controller 72 advantageously allows switching from one mode to another, i.e. position/force and force/pressure. In controller 72 all inputs are swapped into the memory and variables can be assigned to the control loops as indicated by the legends adjacent various components in the loop shown in FIGS. 6 and 8–10.

The PMAC multi-axis controller 72 identified hereinabove provides eight axes of motion control and includes eight axes of motion control and includes eight motor/motion control function components. The eight function components can be switched (addressed) to any encoder in the control system, and the eight function components can be switched (addressed) to any D/A converter output.

In the multi-axis controller 72 the various axes are linked together so each knows the state of the other. This, in turn, provides a relatively tighter coupling of the control system. Both the up and down strokes of the various cylinders for moving the rams and tools can be programmed and there is no need for mechanical stops to control the extent of the movement. Also, since the controller 72 knows the extent of movement of each cylinder during operation between end points, there is no need to return a cylinder to its fall up position before starting transfer of the tools between various operating positions via transfer means 62. In addition, the foregoing positional accuracy enables the movements of the upper and lower rams 56 and 86, respectively, to be precisely controlled which allows for controlling the ratio of ram movements during squeeze-squeeze slug processes as described hereinabove.

It is therefore apparent that the present invention accomplishes its intended objectives. Utilizing a single multi-axes motion controller for process critical automatic slug riveting can reduce cycle times significantly. The level of safety can be increased without adversely affecting cycle time. The repeatability and reliability of the actual slug forming process can be improved over existing control techniques. With more aspects of the process critical applications under closed loop servo control, the need for mechanical stops, directional valves and numerous physical limit switches, as well as all of their associated I/O devices can be eliminated.

What is claimed is:

1. In an automatic apparatus for installing fasteners in a workpiece including a plurality of tools for performing fastener installation operations on said workpiece and a corresponding plurality of motive means for moving said tools relative to said workpiece to perform said fastener installation operations:
   a) a corresponding plurality of servo control devices operatively associated with corresponding ones of said motive means for controlling the operation of said motive means; and
   b) a multi-axis motion controller connected in controlling relation to each of said servo control devices for controlling said fastener installation operations including movements of said tools.

2. Apparatus according to claim 1, wherein said motive means are hydraulically operated and wherein said servo control devices are servo control valves.

3. Apparatus according to claim 1, wherein said tools comprise an upper bucking ram, a drill and a lower ram.

4. Apparatus according to claim 3, wherein said upper bucking ram and said drill are carried by a transfer means for moving said drill and said upper ram into and out of position for operating on said workpiece and wherein said apparatus further comprises motive means for moving said transfer means and a servo control device for controlling the same, said multi-axis motion controller being connected in controlling relation to said servo control device of said transfer means.

5. Apparatus according to claim 1, wherein each of said servo control devices is in a feedback control loop of said multi-axis motion controller.

6. Apparatus for riveting two or more side-by-side workpieces together, the workpieces being provided with aligned apertures in which a slug rivet has been received, said apparatus comprising:
   a) first and second riveting ram means aligned with the rivet, the first riveting ram means being disposed facing said one side of said one workpiece, and the second riveting ram means being disposed facing the outer side of another workpiece;
   b) first moving means capable of moving the first riveting ram means toward the workpiece;
   c) second moving means capable of moving the second riveting ram means toward the workpiece;
   d) first and second servo control devices in controlling relation to said first and second moving means; and
   e) a multi-axis motion controller connected in controlling relation to said first and second servo control devices for controlling movements of said first and second riveting ram means to upset said rivet in said workpieces.

7. Apparatus according to claim 6, wherein said multi-axis motion controller includes means for controlling the ratio of the extent of movement of said first and second riveting ram means relative to each other during upset of said rivet.

8. Apparatus according to claim 6, wherein said first and second servo control devices and said multi-axis motion controller are arranged to place said first aid second riveting ram means under closed loop servo control.

9. Apparatus according to claim 6, wherein said first and second moving means are hydraulically operated and wherein said servo control devices are servo control valves.

10. Apparatus according to claim 6, wherein each of said servo control devices is in a feedback control loop of said multi-axis motion controller.

11. Apparatus according to claim 6, wherein said multi-axis controller includes means for commanding one of said riveting ram means to a snug position with respect to said slug rivet in a programmed axis move.

12. Apparatus according to claim 6, wherein said multi-axis controller includes means for providing a control link between said first and second servo control devices for synchronizing movement of said first and second riveting ram means.

13. In a method for installing fasteners in a workpiece including a plurality of tools for performing fastener installation operations on said workpiece and a corresponding plurality of motive means for moving said tools relative to said workpiece to perform said fastener installation operations:
   a) controlling the operation of said motive means by a corresponding plurality of servo control devices operatively associated with corresponding ones of said motive means; and b) controlling said fastener installation operations including movements of said tools utilizing a multi-axis motion controller connected in controlling relation to each of said servo control devices.

14. A method according to claim 13 including commanding movements of said tools in programmed axis moves.

15. A method for riveting two or more side-by-side workpieces together, the workpieces being provided with aligned apertures in which a slug rivet has been received, said method comprising:

a) providing first and second riveting ram means aligned with the rivet, the first riveting ram means being disposed facing said one side of said one workpiece, and the second riveting means being disposed facing the outer side of another workpiece;

b) providing second moving means capable of moving the first riveting ram means toward the workpiece;

c) providing moving means capable of moving the second riveting ram means toward the workpiece;

d) providing first and second servo control devices in controlling relation to said first and second moving means; and e) utilizing a multi-axis motion controller connected in controlling relation to said first and second servo control devices for controlling movements of said first and second riveting ram means to upset said rivet in said workpieces.

16. A method according to claim 15, further including controlling the ratio of the extent of movement of said first and second riveting ram means relative to each other during upset of said rivet.

17. A method according to claim 15 including placing said first and second riveting ram means under closed loop servo control.

18. A method according to claim 15, further including commanding one of said riveting ram means to a snug position with respect to said slug rivet in a programmed axis move.

19. A method according to claim 15, further including providing a control link between said first and second servo control devices for synchronizing movement of said first and second riveting ram means.

20. A method of riveting two or more side-by-side workpieces together, the workpieces being provided with aligned apertures in which a slug rivet has been received, said method comprising the following steps:

providing first and second riveting ram means aligned with the slug rivet, the first riveting ram means being disposed facing said one side of said one workpiece and the second riveting ram being disposed facing the outer side of another workpiece;

moving the first riveting ram means toward the workpiece in a programmed axis move under control of a multi-axis motion controller to establish a first desired die cavity;

moving the second riveting ram means towards the first riveting ram means in a programmed axis move under control of said controller until both ends of the slug rivet are just in contact with both riveting ram means; and moving the first and second riveting ram means towards each other under control of said controller to form upset heads on both ends of the slug rivet.

21. A method according to claim 20, further including controlling the ratio of the extent of movement of said first and second riveting ram means relative to each other during forming of said upset heads.

22. A method according to claim 20, further including placing said first and second riveting ram means under closed loop servo control.

23. A method according to claim 20, further including providing a control link between said first and second riveting ram means for synchronizing movement thereof.

* * * * *